Jan. 31, 1928.
A. W. COPLAND
1,657,457
DOUGH DEPOSITING MACHINE
Filed Jan. 29, 1923    5 Sheets-Sheet 2
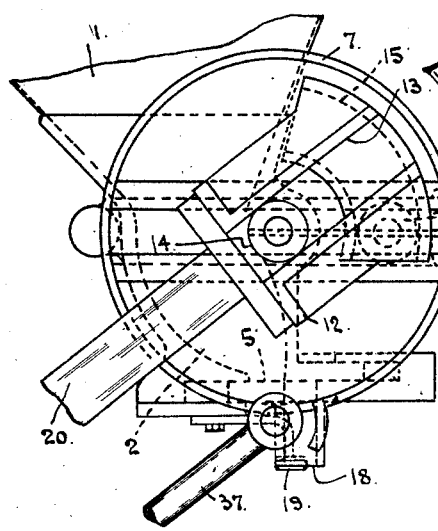
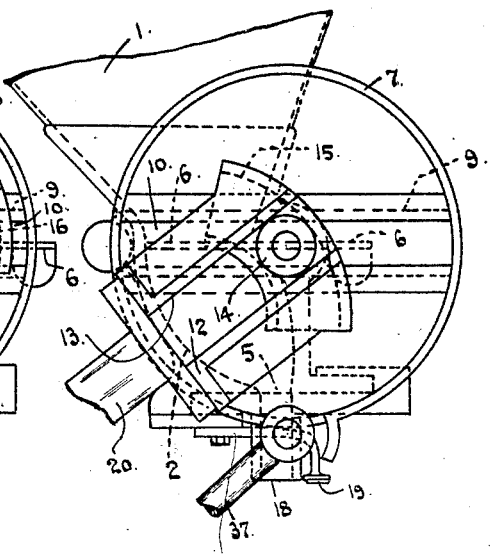
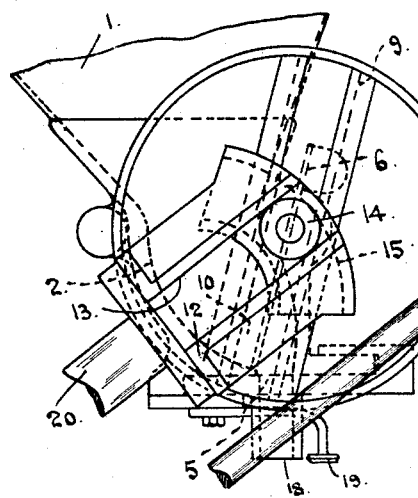
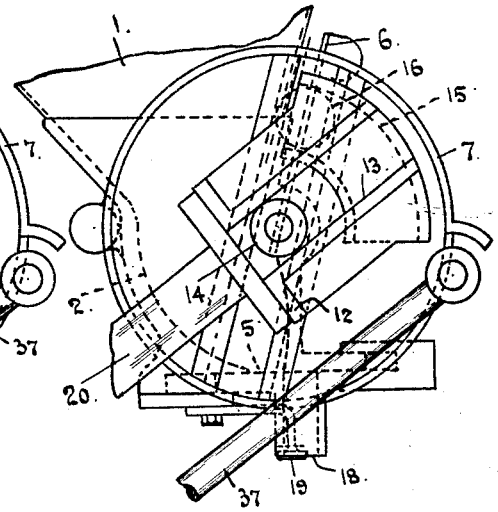
Inventor
Alexander W. Copland
By Whittemore Hulbert Whittemore Belknap
Attorneys.

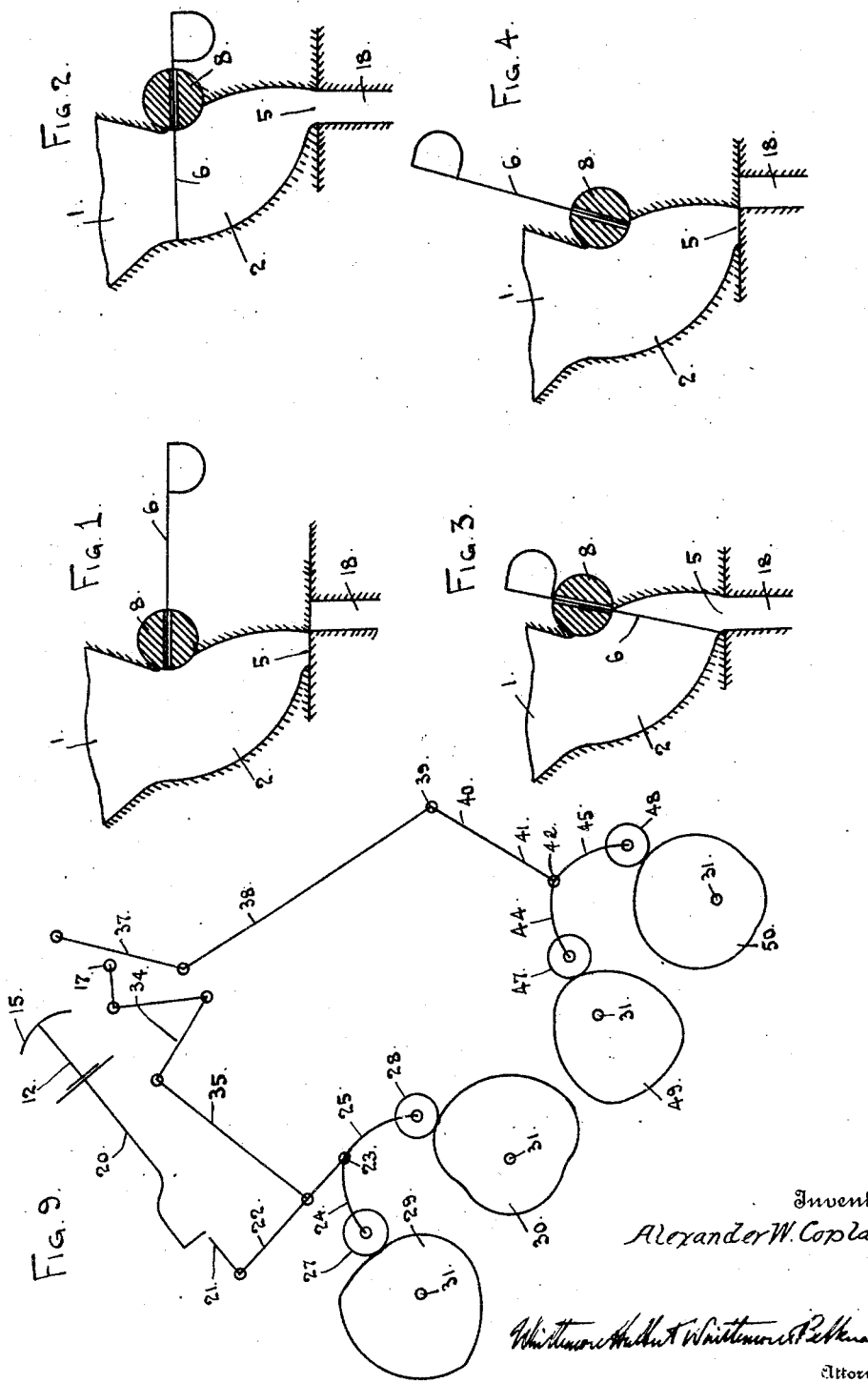

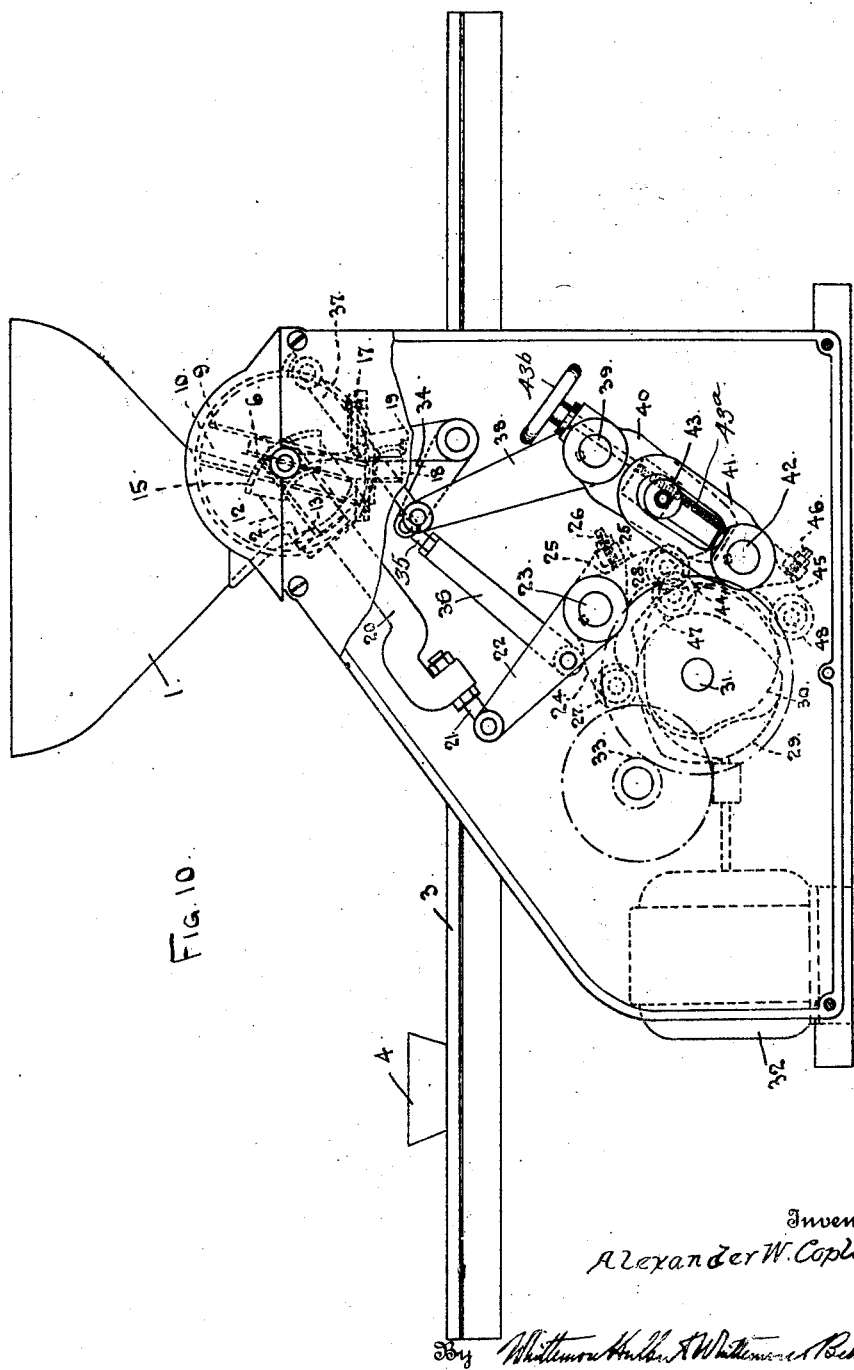

Jan. 31, 1928.

A. W. COPLAND 1,657,457

DOUGH DEPOSITING MACHINE

Filed Jan. 29, 1923    5 Sheets-Sheet 4

Inventor
Alexander W. Copland

By Whittemore Hulbert Whittemore Belknap
Attorneys.

Jan. 31, 1928.

A. W. COPLAND 1,657,457

DOUGH DEPOSITING MACHINE

Filed Jan. 29, 1923   5 Sheets-Sheet 5

Inventor
Alexander W. Copland

Patented Jan. 31, 1928.

1,657,457

UNITED STATES PATENT OFFICE.

ALEXANDER W. COPLAND, OF DETROIT, MICHIGAN.

DOUGH-DEPOSITING MACHINE.

Application filed January 29, 1923. Serial No. 615,649.

The invention relates to machines for depositing dough and has for its object the provision of a machine for automatically measuring and depositing the dough with as gentle a motion as possible to avoid changing the consistency of the dough. Other objects are the provision of a casing into which the dough flows and means operable within the casing for severing the dough at a predetermined point to secure a predetermined quantity and subsequently forcing the dough from the casing in the same general direction taken by the dough in entering the casing; the provision of a combined dough measuring and ejecting blade which is successively movable transversely into the casing to sever the dough, angularly within the casing for forcing the dough therefrom, transversely out of the casing, and angularly to its starting point; the provision of a valve for controlling the discharge opening in the casing, which valve occupies an open position during the angular movement of the blade within the casing toward the discharge opening and a closed position during the return movement of the blade to its starting point; and the provision of means for shearing the dough from the valve when the latter is being moved to closed position.
A further object is to provide means cooperating with the casing to form a measuring chamber having an adjustably variable capacity, whereby different predetermined amounts of dough may be deposited.
With these and other objects in view, the invention resides in the novel features of construction and combinations and arrangements of parts as more fully hereinafter set forth.
In the drawings:

Figures 1, 2, 3, and 4 are diagrammatic views showing the mechanism for measuring and depositing the dough in different positions;
Figures 5, 6, 7 and 8 are side elevations corresponding to Figures 1, 2, 3 and 4 respectively;

Figure 9 is a diagrammatic view of a dough depositing machine embodying my invention;

Figure 10 is a side elevation corresponding to Figure 9;

Figure 11:
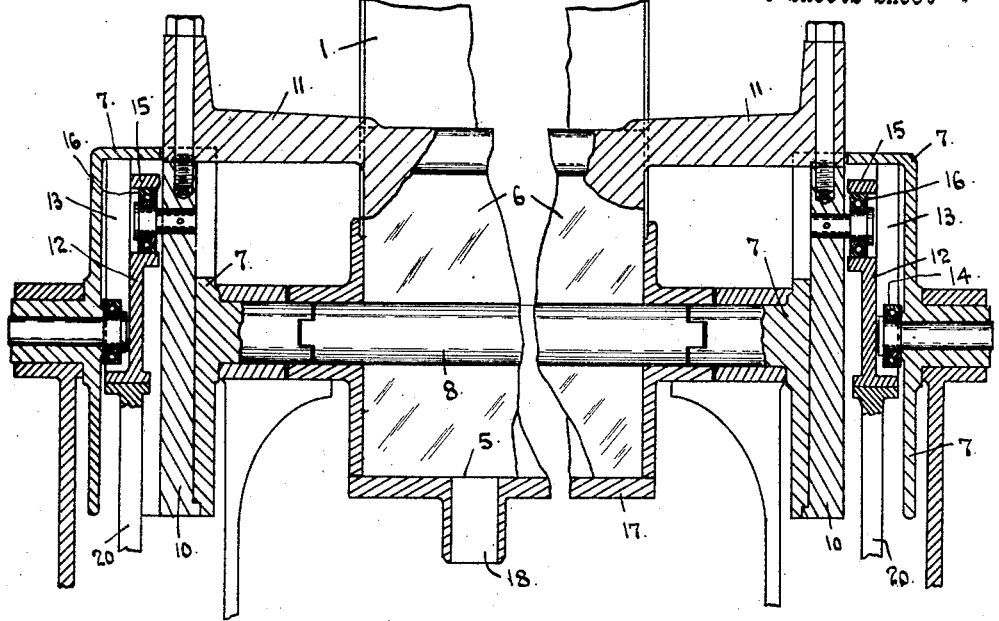
Figure 11 is a sectional elevation thereof.
Figure 12:
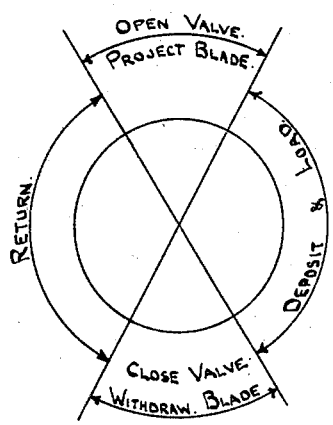
Figure 12 is a diagram of the cycle of operation.

In general, my dough depositing machine is so constructed that the measuring and depositing of the dough is accomplished with as gentle a motion as possible so that its consistency is not changed. In ejecting the dough, only that portion of the dough being ejected is subjected to pressure.

In detail, 1 is the hopper, 2 the casing below and connected to the hopper for receiving the dough flowing from the hopper, and 3 is the table movable beneath the hopper and casing and carrying the pans 4 for receiving the dough as it leaves the casing. The cross sectional area of the passageway through the casing 2 progressively decreases from its upper entrance end to its lower discharge end in which the discharge opening 5 is located, the arrangement being such that the dough may freely enter the casing. 6 is the combined measuring and ejecting blade movable angularly within the casing toward the discharge opening, the side wall of the casing engaged by the end of the blade being concentric with the axis of rotation of the blade. This blade cooperates with the casing to form a measuring chamber.

For measuring and depositing the dough with as gentle a motion as possible, it is essential that the combined measuring and ejecting blade be moved transversely into the casing to sever the dough, measuring a predetermined amount of the same, be moved within the casing toward the discharge opening to force the measured amount therefrom, be moved transversely out of the casing, and then be returned to its starting point. As shown, 7 are axially aligned rotatable housings at the opposite sides of the machine which are connected by the sectional shaft 8 and are simultaneously oscillated to angularly move the blade which slidably engages in the intermediate section of the shaft. Since the arrangement of the housings and the operating mechanism therein is the same at each side of the machine, the arrangement at one side only will be described.

In detail, each housing 7 has in its inner side wall the diametrically extending guideway 9 in which the slide 10 reciprocates, this slide carrying the cross head 11 to which the blade 6 is secured. 12 is the reciprocable slide actuating member within the housing having the longitudinally extending guideway 13 engaged in by the anti-friction bearing 14 which is concentric with the axis of rotation of the housing. This reciprocable slide actuating member also has the transversely extending segmental guideway 15 at its upper end which is engaged in by the anti-friction bearing 16 secured to the slide 10. The reciprocable slide actuating member is actuated when the housing 7 with its guideway 9 is stationary, this member moving in one direction when the guideway 9 is inclined to one side of the longitudinally extending guideway 13 of the member and moving in the opposite direction when the guideway 9 is inclined to the other side of the guideway 13. The arrangement is such that during the reciprocation of the slide actuating member 12, the slide 10 carrying the blade is reciprocated in the guideway of the housing, the anti-friction bearing 16 moving in the transversely extending guideway 15 of the slide actuating member.

The housing and the reciprocable slide actuating member are actuated by timed mechanism so that with the parts in position as shown in Figures 1 and 5 with the dough receiving casing filled with dough, the first step consists in radially moving the blade into the casing to sever and measure a predetermined amount of dough. This step is accomplished by the downward movement of the slide actuating member which moves the parts to positions shown in Figures 2 and 6. In the next step, the blade is angularly moved within the casing by rotating the housing in a counter clockwise direction to swing the blade toward the discharge opening of the hopper and force the dough below the blade through the discharge opening, the parts then occupying the positions as shown in Figures 3 and 7. As the blade is being swung downwardly, the dough thereabove follows the blade owing both to the effect of gravity and of vacuum created by the blade. The blade is then withdrawn radially from the casing by the upward movement of the slide actuating member, the parts occupying the positions shown in Figures 4 and 8. To return the blade to its starting point shown in Figures 1 and 5, the housing is rotated in a clockwise direction.

17 is a valve for controlling the discharge opening 3, this valve having the depending discharge spout 18 which is adapted to register with the discharge opening during the angular movement of the blade 6 within the housing toward the discharge opening. 19 is a dough shearing member secured to the housing and positioned to cooperate with the lower end of the discharge spout to shear the dough therefrom when the valve is being moved to closed position. As shown in Figures 1 and 5, the valve is in closed position with its discharge spout immediately above the dough shearing member when the blade is at its starting point. As the blade is moved radially into the casing the valve is advanced to open position so that prior to the angular movement of the blade within the casing, the discharge opening is free as shown in Figures 2 and 6 and remains so until the angular movement of the blade within the casing has been completed as shown in Figures 3 and 7, after which the valve is withdrawn to closed position during the radial movement of the blade out of the casing so that when the blade has been radially moved out of the casing, the valve is in closed position as shown in Figures 4 and 8 in which it remains during the angular return movement of the blade to its starting point.

The mechanism as shown in Figures 9 and 10 for actuating the reciprocable slide actuating member 12, oscillating the housing 7 and reciprocating the valve 17, is as follows: The slide actuating member is secured to the upper end of the rod 20, the lower end of which is adjustably secured to the bolt 21. The lower end of this bolt is pivotally connected to the upper end of the lever 22 which has its lower end keyed upon the shaft 23 journalled in the frame of the machine. 24 and 25 are diverging rock arms, the former of which is keyed upon the shaft 23 and the latter of which is journalled upon this shaft. To rock the shaft upon movement of the rock arm 25, there is the adjustable set screw 26 threadedly engaging the rock arm 24 and abutting the rock arm 25. Anti-friction rollers 27 and 28 are journalled in the free ends of the rock arms 24 and 25 respectively and engage the peripheries of the cams 29 and 30 respectively keyed upon the shaft 31 which is journalled in the frame of the machine and driven from the motor 32 through suitable reduction gearing 33. The valve 17 is pivotally connected to one end of the bell crank 34 pivotally mounted upon the machine frame and having its other end pivotally connected to the eye bolt 35 adjustably mounted in the upper end of the link 36, the lower end of which is pivotally connected to the lever 22.

The housing 7 is pivotally connected to the upper end of the link 37 the lower end of which is pivotally connected to the lever 38. This lever is keyed upon the shaft 39 journalled in the machine frame and is rocked by the lever 40 also keyed upon the shaft 39. The lever 40 is actuated from the lever 41 keyed upon the shaft 42 journalled in the machine frame, the connection between these two levers comprising an anti-friction roller 43. This roller engages a slot in the lever 41 and is mounted on a bearing longitudinally adjustable on the lever 40 by means of a screw 43ª and a hand wheel 43ᵇ, the arrangement being such that by adjusting said roller the relative lengths of the levers 40 and 41 can be varied to change the amount of movement imparted to the housing 7. This in turn varies the angular movement of the blade 6 and the quantity of dough cut off and ejected. 44 and 45 are diverging rock arms, the former of which is keyed upon the shaft 42 and the latter of which is journalled thereon. To rock the shaft 42 from the rock arm 45, I have provided the set screw 46 threadedly engaging the rock arm 44 and abutting the rock arm 45. 47 and 48 are anti-friction rollers journalled in the free ends of the rock arms and respectively engaging the peripheries of the cams 49 and 50, keyed upon the shaft 31. By reason of the roller 43 adjustably engaging in the levers 40 and 41, the angular movement of the housings 7 and consequently of the blade 6 can be readily varied to vary the amount of dough deposited upon each ejecting movement of the blade.

Figure 13:
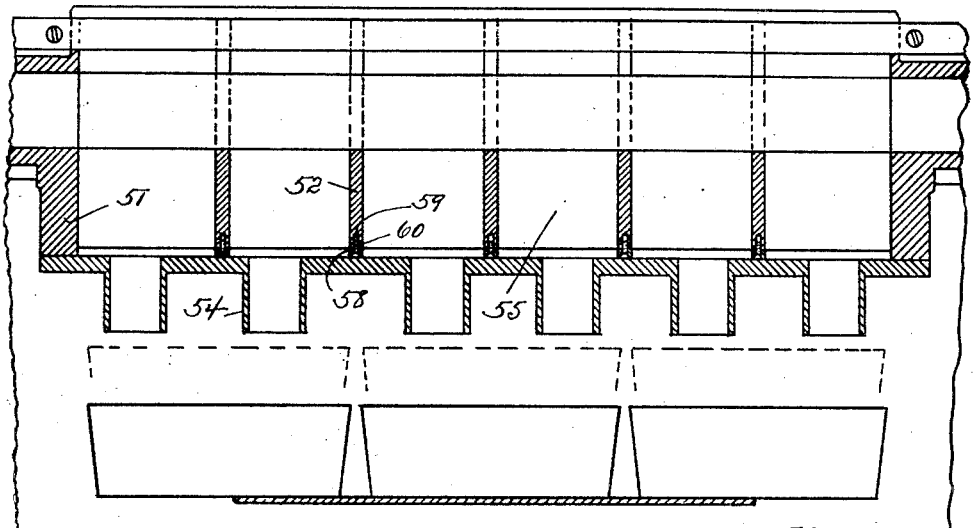
Figures 13 and 14 are respectively longitudinal and tranverse sections through a modified construction of dough receiving casing.
Figure 14:
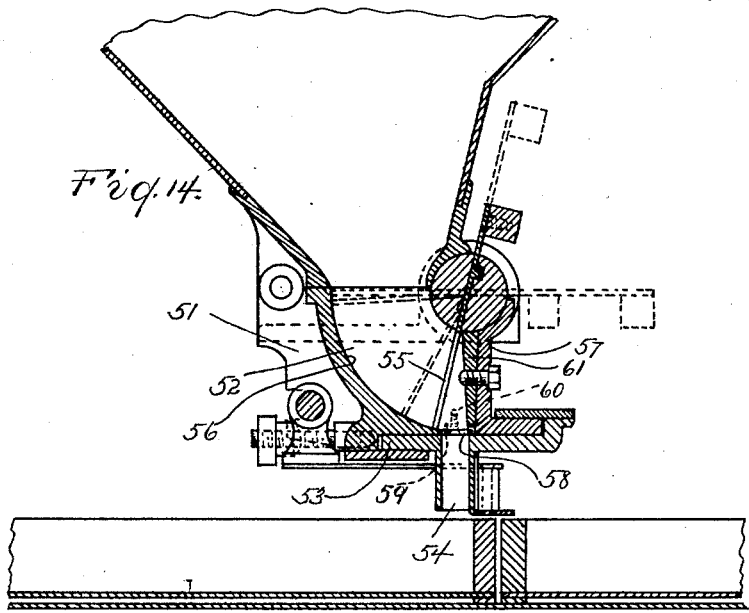

For the purpose of accurately depositing the desired amounts of dough in a number of pans at the same time, the casing for receiving the dough is divided by spaced transversely extending partition walls into a number of chambers in each of which a combined dough severing and ejecting blade operates. Thus as shown in Figures 13 and 14, the casing 51 is provided with the series of spaced transversely extending partition walls 52 dividing the casing into a plurality of chambers and preventing transverse flow of the dough from one chamber to another. 53 is a member secured to the bottom of the casing and having a pouring spout 54 communicating with each chamber. There is a combined dough severing and ejecting blade 55 operable in each chamber for first severing the dough and then forcing the same from the chamber through the pouring spout communicating therewith, each blade having the same axis of rotation and being simultaneously operated by the same actuating mechanism such as that shown in Figures 5 to 11 inclusive.

In order to facilitate the machining of the inner surface of the curved wall of the casing in concentric relation to the axis of rotation of the combined dough severing and ejecting blade, the bottom of the casing has an opening extending longitudinally from one end wall to the other and located between the curved wall 56 and the rear wall 57, whereby the inner surface of the curved wall may be machined throughout its entire extent. To close the space between each partition wall 52 and the spout member 53, I have provided the filler member 58 which is positioned relative to the partition wall by dowels 59 and secured thereto by the screw 60. A suitable filler member 61 is also provided for each chamber, it being secured to the rear wall 57 of the casing.

From the above description, it will be readily seen that I have provided a dough depositing machine including means movable transversely into the casing to sever the dough and movable within the casing with the flow of the dough to eject the dough, whereby predetermined amounts of the dough are deposited with as gentle a motion as possible so that the consistency of the dough is not altered; and in which only that portion of the dough being deposited is subjected to pressure. It will also be observed that I have provided a machine in which accurate amounts of dough may be deposited into a number of pans at the same time, and in which the amount of dough deposited at any one time may be readily varied by adjusting the adjustable connections in the operating mechanism. Such adjustments can be made while the machine is in operation by turning the hand wheel 43ᵇ so that the operator can secure the desired quantity of deposit without stopping the machine. The partitions 52 which divide the space into compartments each having its own measuring and ejecting blade prevents any possibility of a transverse flow and the ejection of a greater quantity at one point of deposit than at another.

What I claim as my invention is:

1. In a dough depositing machine, the combination with a casing having a receiving opening at its upper end and a discharge opening at its lower end, of a blade movable angularly within said casing from the receiving toward the discharge opening and transversely into and out of said casing at the opposite ends of its angular movement, and a cut-off for controlling the discharge opening movable in timed relation to said blade.

2. In a dough depositing machine, the combination with a casing having a receiving opening at its upper end and a discharge opening at its lower end, of a blade movable into and out of said casing and also movable angularly within said casing from the receiving end toward the discharge opening, a cut-off for controlling the discharge opening, and timed mechanism for operating said cut-off whereby said casing is open during the downward angular movement of said blade and closed during the upward and inward movements thereof.

3. In a dough depositing machine, the combination with a casing for receiving and discharging dough in one general direction of flow, of a common means for severing the dough and ejecting the same, and means for inserting said severing and ejecting means transversely into said casing and for moving said severing and ejecting means within said casing transversely of its direction of insertion through different distances for ejecting different predetermined amounts of dough.

4. In a dough depositing machine, the combination with a casing for receiving and discharging dough with one general direction of flow, of a blade movable angularly within said casing and radially into and out of said casing at the ends of the angular movement, and means for varying the angular movement of said blade.

5. In a dough depositing machine, the combination with a casing for receiving and discharging dough with one general direction of flow, of a blade movable angularly within said casing and radially into and out of said casing at the opposite ends of the angular movement, and means for varying the angular position of radial insertion of said blade whereby the quantity of dough discharged is correspondingly varied.

6. In a dough depositing machine, the combination with a casing having a hopper at its upper end and a plurality of partitions for forming a series of separate chambers beneath said hopper and opened thereto, each of said chambers having a discharge opening and a member movable in each chamber to sever and eject the dough therefrom.

7. In a dough depositing machine, the combination with a casing for receiving dough, of spaced transverse partition walls in a portion of said casing forming a plurality of chambers connecting with a common chamber, and a blade for each chamber insertable transversely thereinto to sever the dough and movable therein in the direction of flow taken by the severed dough in entering the chamber to eject the same.

In testimony whereof I affix my signature.

ALEXANDER W. COPLAND.